Nov. 4, 1930.  O. M. NACKER  1,780,498
BRAKE EQUALIZING MECHANISM
Filed Nov. 30, 1925   2 Sheets-Sheet 1
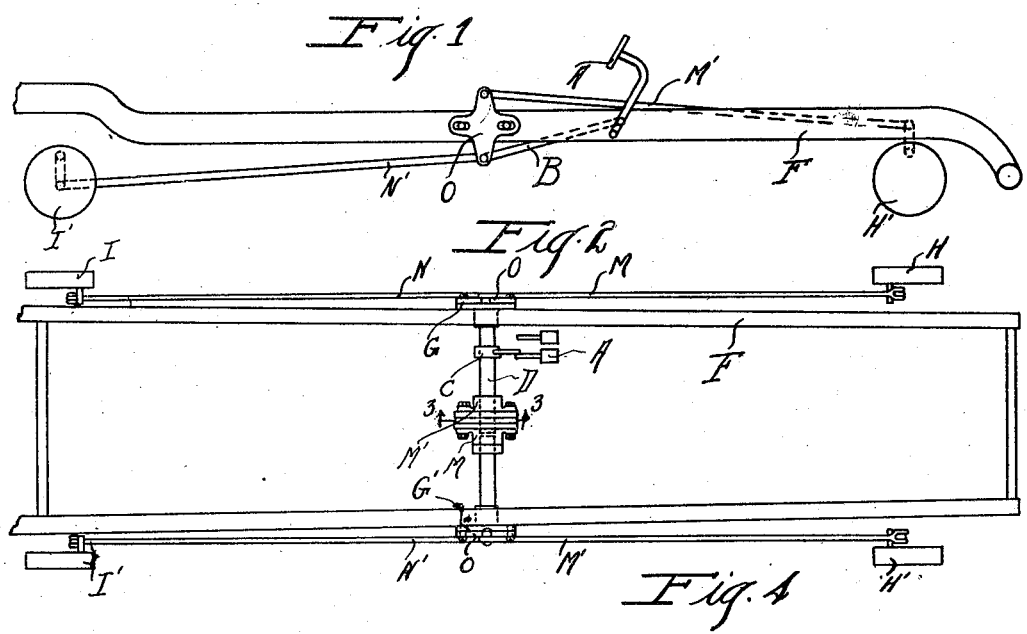
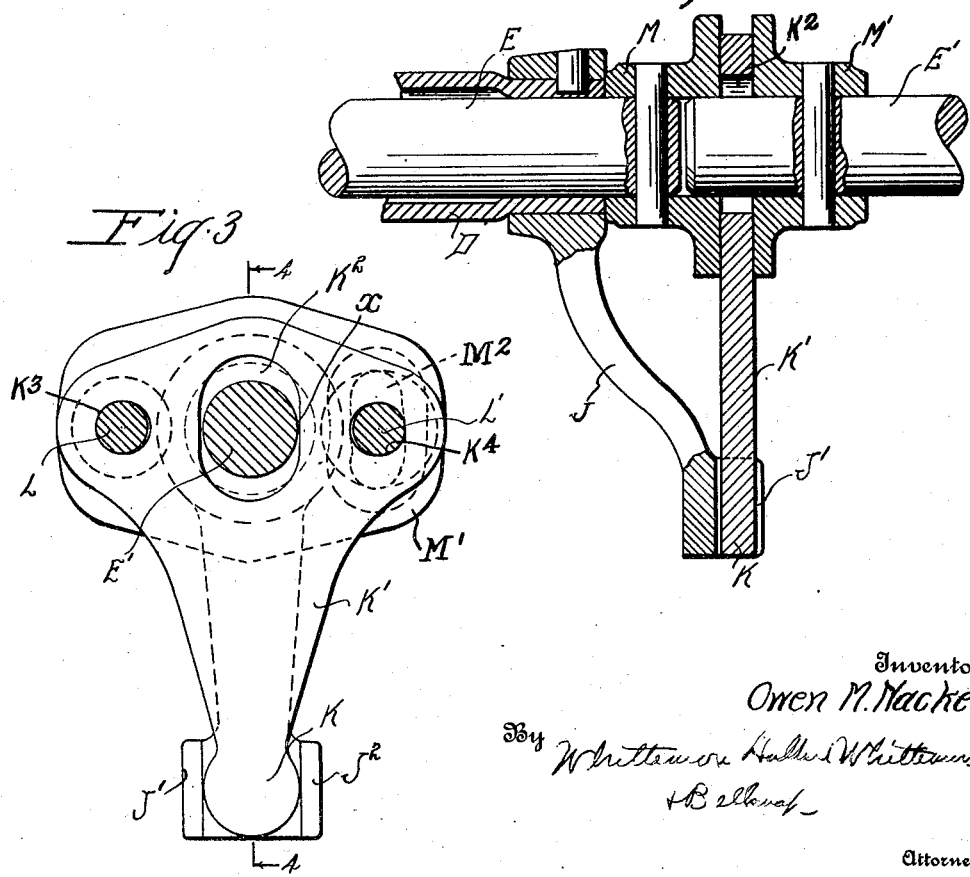
Inventor
Owen M. Nacker
By Whittemore Hulbert Whittemore
& Belknap
Attorneys

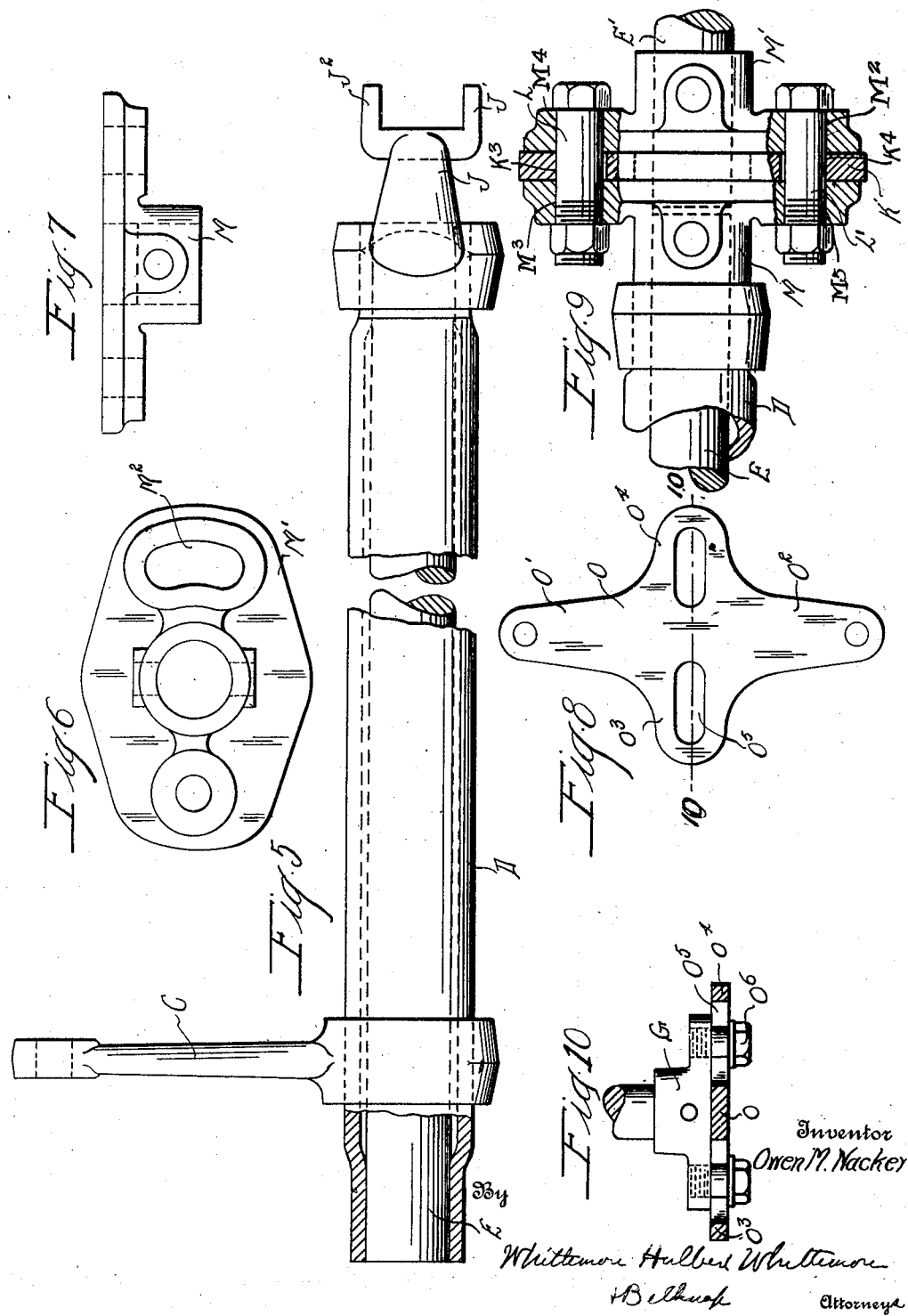

Patented Nov. 4, 1930

1,780,498

UNITED STATES PATENT OFFICE

OWEN M. NACKER, OF DETROIT, MICHIGAN, ASSIGNOR OF ONE-HALF TO ALANSON P. BRUSH, OF DETROIT, MICHIGAN

BRAKE-EQUALIZING MECHANISM

Application filed November 30, 1925. Serial No. 72,344.

The invention relates to vehicle brake systems in which a plurality of wheel brakes are operated from a common actuating member. There are two distinct types of systems which have heretofore been used, first, equalizing systems in which the actuating force is automatically divided between the several brakes, and second, rigid systems where the connections between the actuating member and the several brakes are independent of each other and must be adjusted to maintain proper balance. Each of these systems has certain advantages and certain defects. Thus, the equalizing system does away with the necessity of accurate adjustment but has the disadvantage that the breakage of any connecting link of one brake will release the whole system. On the other hand, the rigid system, while having the advantage of maintaining the several brakes independently operative, requires careful and accurate adjustment to equalize the braking connection.

It is the object of the present invention to combine the advantages and avoid the defects of the two types by a system which may be alternatively equalizing or rigid. It is a further object to obtain such advantages with the simple construction of mechanism and one which may be easily adjusted by an unskilled operator.

With this and other objects in view, the invention consists in the construction as hereinafter set forth.

In the drawings;

Figure 1 is a diagrammatic side elevation of my improved brake mechanism as applied to a motor vehicle.

Figure 2 is a plan view thereof.

Figure 3 is a cross section on line 3—3 of Figure 2.

Figure 4 is a section on line 4—4 of Figure 3.

Figure 5 is a bottom plan view of a portion of the mechanism.

Figures 6, 7, and 8 are details designated by reference characters.

Figure 9 is a plan view partly in section of the assemblies shown in Figures 3 and 4.

Figure 10 is a sectional plan view substantially on line 10—10 of Figure 8.

The essential feature of my improved construction is an element connecting a plurality of brakes which in one adjustment will equalize and in another is rigid. With such an element present the operator may take his choice of the rigid or equalizing system and easily change over from one to the other. Assuming that the rigid system is desired, the element is first adjusted to equalize and power is then applied to the actuating member which will be distributed equally to the several brakes. While this force is still applied, the element will be adjusted into rigid position with the result that a rigid system is produced which is perfectly balanced.

My improvement may be applied to various types of brake mechanisms but as shown, A is the actuating brake pedal which is connected by the rod B with rock arm C on the tubular shaft D. This shaft is mounted upon a shaft E arranged in axial alignment with a similar shaft E' and together extending transversely of the chassis frame F. The shafts E and E' have arranged at their opposite ends the heads G and G' which are connected through mechanism hereinafter described with the brakes H, H', I, I' for the wheels respectively on the forward and rear axles.

To permit of perfect equalization between these various brakes I provide first for equalization between the brake actuating heads G and G' on opposite sides of the car, and, second, equalization between the forward and rear brakes on each side. As shown in Figures 3 and 4 the shafts E and E' which respectively actuate the heads G and G' are connected to the actuating tubular shaft D through an equalizer of the following construction; J is a rock arm secured to and depending from the shaft D and having at its lower end the flanges J', J² which slidably embrace the rounded head K on a rock arm K'. This rock arm is arranged between flanged hub members M and M' mounted respectively on the shafts E and E'.

The rock arm K' is provided substantially centrally with a slot K² for the passage of the shaft E' and is provided on opposite sides of this slot with the openings K³ and K⁴ respectively. Fitted in the opening K³ is a pin L and this pin projects into the member M' where it is fitted in an opening M⁴ and passes through a slot M³ in the member M. A pin L' is fitted in the opening K⁴ and this pin is fitted in an opening M⁵ in the member M and passes through a slot M² in the member M'.

The operation of this equalizer is as follows. If a force is applied to the head K tending to move the same toward the left as viewed in Figure 3, the member K' will pivot on the shaft E' about the point X. This will tend to move the opening K³ and pin L upwardly and the opening K⁴ and the pin L' downwardly. The horizontal force exerted on the head K will be balanced by the pressure of the arm K' on the shaft E' while the upward force on the pin L will be balanced by an equal downward force on the pin L'. Thus if the movement of the pin L upwardly is retarded by any given force, the arm K' will slide on the shaft E' until the pin L' is retarded by an equal force so that equal forces will be applied to the pins L and L' and the shafts E and E' will be rotated with an equal force. The slots M² and M³ are for the purpose of permitting adjustment of the members M and M' relative to each other prior to the locking of the same in the manner hereinafter to be more fully brought out, it being noted that the slot in the member M' is in alignment with the opening in the member M, while the slot in the member M is in alignment with the opening in the member M'.

The forward and rear brakes H, I and H', I' are actuated respectively from the heads G, G' through the medium of rods M, N, M', N'. These rods are not, however, directly attached to the heads G, G' but are connected thereto through the medium of an equalizing plate O. This, as shown in Figures 1 and 8 has the upwardly and downwardly extending arms O', O² respectively connected with the rods M and N and the laterally extending arms O³, O⁴ which latter are slotted horizontally at O⁵. Clamping bolts O⁶ pass through the slots O⁵ and engage the heads G, G' to communicate a torque thereto. Thus, upon the application of a torque to the member G, the plate O will be turned until one of the rods M or N reaches the limit of its movement, whereupon the plate O will pivot about its point of connection with the rod which has reached the limit of its movement and the bolts O⁶ will slide in the slots O⁵ to more directly apply force to the other rod until this latter rod has also reached the limit of its movement and the force applied to the two rods is equalized.

With the construction as described where the brake is to be used as an equalizing system the clamping bolts O⁶ and L, L' are loosened so that any pressure applied to the pedal A will be equally distributed to the several brakes. If, however, it is desired to use a rigid system, this may be perfectly equalized by first applying pressure to the pedal A sufficient to apply all of the brakes and then while this pressure is still maintained, adjusting the clamping screws L, L' and O⁶ so as to clamp all of the equalizers. If, at any time during the use of the system the brakes get out of balance, all that is necessary is to loosen the clamping screws and again equalize in the manner just described.

What I claim as my invention is:

1. In a brake system, the combination with a plurality of brakes and a common actuating member therefor, of an equalizing connection between said brakes and means including a portion of said equalizing connection for locking said equalizing connection.

2. In a brake system, the combination with a plurality of brakes and a common actuating member therefor, of connections between said actuating member and the several brakes including independent connecting elements and a common equalizing element, and means including a portion of said equalizing element for locking said equalizing element.

3. In a brake system, the combination with a plurality of brakes and a common actuating member therefor, of independent actuating connections to said brakes and a common element connecting said independent connections with said actuating member, said element being adjustable to be alternatively an equalizer and a rigid connector.

4. In a brake system the combination with a plurality of groups each comprising a plurality of brakes, and a common actuating member therefor, connections between said actuating member and each of the groups including an equalizing element, connections to each of the brakes of each group including an equalizing element, and means for locking said equalizing elements to render the whole system rigid.

5. In a brake system, the combination with brakes for the wheels of forward and rear axles on each side of the car, of a common actuating member for said brakes, an operating connection between said actuating member and the brake mechanisms on opposite sides of the car including an equalizing element, actuating connections for the brakes on the same side of the car including an equalizing element and means for clamping all of said equalizing elements to render the whole system rigid.

6. In a brake system, the combination with a plurality of brakes, and a common actuating member therefor, of a plurality of equalizing elements arranged between the common actuating member and the said brakes, and means for locking each of the said equalizing elements.

7. In a brake system, the combination with a plurality of brakes, and a common actuating member therefor, of a plurality of equalizing connections arranged between the common actuating member and the said brakes and adjustable means for converting said equalizing connections into rigid connections.

8. In a brake system, in combination an actuating pedal, a plurality of rotatable shafts, an equalizing connection between the said actuating pedal and the said shafts, brake actuating rods, an equalizing connection between each of the said shafts and a plurality of the said brake actuating rods and means for locking said equalizing connections to convert the same into rigid connections.

In testimony whereof I affix my signature.

OWEN M. NACKER.